United States Patent
Ye et al.

(10) Patent No.: US 9,854,337 B1
(45) Date of Patent: Dec. 26, 2017

(54) METHOD FOR CONSTRUCTING AN AWG BASED N×N NON-BLOCKING OPTICAL MULTICAST SWITCHING NETWORK

(71) Applicant: Shanghai Jiao Tong University, Shanghai (CN)

(72) Inventors: Tong Ye, Shanghai (CN); Tony T. Lee, Shanghai (CN); Weisheng Hu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 15/344,891

(22) Filed: Nov. 7, 2016

(30) Foreign Application Priority Data

Jul. 28, 2016 (CN) .......................... 2016 1 0608219

(51) Int. Cl.
*H04Q 11/00* (2006.01)

(52) U.S. Cl.
CPC . *H04Q 11/0005* (2013.01); *H04Q 2011/0016* (2013.01); *H04Q 2011/0047* (2013.01); *H04Q 2011/0058* (2013.01)

(58) Field of Classification Search
CPC ....... H04Q 2011/0047; H04Q 11/0066; H04Q 11/0062; H04Q 11/0005; H04J 14/0298
USPC .......................................................... 398/48
See application file for complete search history.

(56) References Cited

U.S. PATENT DOCUMENTS

| | | | | |
|---|---|---|---|---|
| 6,850,515 B2* | 2/2005 | Chang | ................ | H04J 14/0227 370/352 |
| 6,873,797 B2* | 3/2005 | Chang | ................ | H04L 12/1836 370/390 |
| 2010/0027996 A1* | 2/2010 | Chung | ................ | H04J 14/0219 398/49 |

* cited by examiner

*Primary Examiner* — Don N Vo
(74) *Attorney, Agent, or Firm* — Mei & Mark LLP; Manni Li

(57) ABSTRACT

A method for constructing an AWG based non-blocking optical multicast switching network, comprising constructing a non-blocking optical copy network via a wavelength replication module and an arrayed waveguide grating recursively and constructing a non-blocking optical multicast switching network via cascading a data copy network with a point-to-point switching network. The number of active optical devices required for constructing an N×N optical switching network with r input/output ports and with each port carrying m wavelengths is just $O(N \log_m N)$, realizing system scalability and saving hardware cost and power consumption. By splitting the routing path of the multicast network into a routing path with $O(1)$ complexity in the copy network and a routing path in a point-to-point unicast switching network, the routing complexity of the multicast switching network is equivalent to that of a unicast switching network.

8 Claims, 5 Drawing Sheets

METHOD FOR CONSTRUCTING AN AWG BASED N×N NON-BLOCKING OPTICAL MULTICAST SWITCHING NETWORK

CROSS-REFERENCE AND RELATED APPLICATION

The subject application claims priority on Chinese patent application No. 201610608219.9 filed in China on Jul. 28, 2016, entire contents of which is incorporated herein by reference.

FIELD OF INVENTION

The present invention relates to an optical switching network, particularly, a method for constructing an AWG (Arrayed Waveguide Grating) based N×N non-blocking optical multicast switching network.

BACKGROUND OF INVENTION

Thanks to immense transmission capacity of the optical fiber, the wavelength divide multiplex (WDM) optical network is regarded as a mainstream technology for the next generation optical network having a huge transmission bandwidth. In the mean time, communication services, such as video conference, IPTV, distributed computing in data centers, are rapidly increasing and in particular for large scale data analysis in MapReduce, Hapdoop, and Spark with orientation towards stock prediction, disaster alarm, disease diagnosis, product recommendation, and user preference analysis. These business applications need to be carried out in one or multiple server clusters, with data transmission in a one-many or many-many communication mode, and bring immense transaction requirement for network support to high bandwidth multicast. With maturation in optical devices such as the semiconductor optical amplifier (SOA), optical coupler (OC), tunable optical filter (TOP), wavelength converter (WC), and arrayed waveguide grating (AWG), it is now an important research topic to design a multicast switching network based on optical devices to fully make use of the immense transmission capacity provided by the WDM optical network to satisfy ever-increasing multicast communication requirement.

The challenge in designing a multicast optical switching network is to realize the system scalability and non-blocking requirement while taking into account the following considerations:

(1) with an ever increasing network, the number of the active optical devices should not increase too rapidly, as these active optical devices monopolize equipment cost and energy consumption in the system;

(2) the scale of passive optical devices should not be too big, as the performance of the passive optical devices, such as AWG and OC, drastically deteriorate with the increase in the number of input and output ports;

(3) the number of wavelengths, as one of the important resources adopted in the system, should also not be too big; and (4) the complexity of the algorithm used by the multicast switching network should be as low as possible, so that the algorithm may be easily implemented in the system.

To meet the above challenges, five design schemes for the AWG based multicast optical switching network are carried out currently:

The first scheme consists of an SOA based non-blocking crossbar network from SOA optical switches. A 1×N OC corresponds to each input port, and an N×1 OC corresponds to each output port, with each 1×N OC output port being connected with each N×1 OC input port via an SOA. The number of the SOAs required by the N×N switching network is $O(N^2)$, and hence the scheme is poorly scalable.

The second scheme is to construct a sparse crossbar network for realizing switching functions. The number of the SOAs in the second scheme is less than that of the first scheme, but the number of the SOAs is still in the order of $O(N^2)$ for an N×N switching network.

The third scheme is to construct a switching network in three stages via an SOA-based crossbar network modules, with each stage comprising multiple smaller scale SOA switching matrix modules and each module being connected with each module in a neighboring stage. Such a scheme decreases the number of employed SOAs but requires a non-blocking routing algorithm with a complexity of $O(dN)$ for an N×N network. In the mean time, links in each stage do not fully take the advantages offered by WDM networks, and instead, with each link carrying a wavelength, and therefore the internal complexity of the network is relatively high.

The fourth scheme is to construct a switching network in two stages via AWG-based switching modules and SOA-based switching matrix. On one hand, such a scheme does not provide a feasible non-blocking routing algorithm; on the other hand, the SOA based switching matrix does not take consideration of wavelength divide multiplex properties, and thus the internal complexity of the network is also relatively high.

The fifth scheme is to construct a multicast non-blocking switching network based on an AWG. Such a scheme employs part of the input ports of the AWG as unicast input ports, with the remaining ones as multicast input ports. Data of a multicast request need an extra switching for multicast entrance to the network, and thus the multicast capacity is limited in addition to an extra switching. Moreover, the numbers of the input and output ports of the AWGs, the tuning scope of the wavelength converter, and the wavelength granularity of the system all increase with the increase of the scale of the network, resulting in poor scalability of the system.

SUMMARY OF THE INVENTION

The present invention solves the scalability issue in constructing a non-blocking optical multicast switching network. The present invention provides an AWG based non-blocking and scalable optical multicast switching network by recursive construction of non-blocking optical copy networks via adoption of wavelength replication modules (WR-modules) and arrayed waveguide gratings (AWGs) and by constructing a non-blocking optical multicast switching network via cascading a copy network for data replication with a AWG-based network for point-to-point switching. As the result, the number of required active optical devices for constructing an N×N optical multicast switching network with r input/output ports and with each port carrying m wavelengths is just $O(N \log_m N)$, wherein $N=rm$, and further with a routing complexity equivalent to that of a unicast optical switching network.

The present invention provides a method for network construction comprising the following steps:

(a) constructing a multiple-stage copy networks $\mathcal{C}_C(r,m)$: constructing a copy network $\mathcal{C}_A(r,m)$ in three stages via m×m WR-modules and m×m AWGs, and decomposing subnetworks thereof recursively in $i=\log_m r-1$ times so that a central stage network thereof is $\mathcal{C}_B(m,m)$;

constructing an AWG-based N×N multicast network $\mathcal{C}$ (r, m): cascading the two copy networks $\mathcal{C}_C(r,m)$ and combining an output stage of one $\mathcal{C}_C(r,m)$ for performing replication on the input side with an input stage of the other $\mathcal{C}_C(r,m)$ for performing point-to-point switching on the output side;

comprising the following network routing steps: splitting up of a multicast request: splitting up an optical multicast request from the $\mathcal{C}$ (r,m) into a copy sub-request for replication on the copy network on the input side and a point-to-point unicast switching sub-request for point-to-point switching on the copy network on the output side, with a rule for splitting as: allocating a set of consecutive output channels of the copy network on the input side sequentially for each multicast request according to an address of an input channel thereof sequentially and a number of required data copies, thus constructing a monotone copying request on the copy network $\mathcal{C}_C(r,m)$ of the input side and a point-to-point switching request on the copy network $\mathcal{C}_C(r,m)$ of the output side; and non-blocking routing of a monotone request from the copy network on the input side and wavelength allocating: labeling of the request: labeling a replication request for replication of a set D from the input channel of the address s to an output channel address d as C(s,D);

ordering the multicast request: ordering the addresses of the input channels of the data of the multicast request in a sequential ordering as $C_0, C_1, C_2, \ldots, C_i, \ldots$;

(b) allocating a routing path and the wavelength: allocating the request with the label $C_i$ to the middle stage subnet with the label $\gamma=[i]_m$ counting top down, employing a wavelength $\lambda_{[\alpha+\gamma]_m}$ in-between the input stage WR-module with the label and the middle stage subnet γ, employing a wavelength in-between the input stage WR-module with the label β and the middle stage subnet γ, and allocating in a same manner recursively in each subnet: re-ordering the request from the subnets, labeling the request with the label $C_i$ by a new label $C_{i'}$ in the subnet γ, wherein $i'=\lfloor i/m \rfloor$, allocating the routing paths and wavelengths in the subnet according to the new sequence number, and finally allocating the request in the middle stage network cell $\mathcal{C}_B(m,m)$ to a corresponding WR-module by a same allocating rule;

non-blocking routing of a point-to-point switching request in the point-to-point network $\mathcal{C}_C(r,m)$: routing with a prior art routing algorithm.

In comparison with prior art, the present invention is advantageous in that:

(1) The order of the number of active devices for the AWG based multicast network $\mathcal{C}$ (r,m) of the designing scheme of the present invention is just $O(N \log_m N)$. For a special variable m=EN1/2 (E being a constant), the order is O(N). Hardware cost and power consumption are saved for construction of large scale optical multicast switching networks.

(2) Network construction only employs modular m×m AWGs and m×m WR-modules. At the mean time, as the wavelength separation property of the wavelength copy module is fully made use of, wavelength reuse is realized in the network of the present invention, thus wavelength granularity and tuning scope of the wavelength selective converter is decreased to m, and further, the size of the AWGs and that of the granularity of the network wavelength do not increase with the increase of the scale of the network.

(3) The designing scheme of the AWG based multicast network $\mathcal{C}$ (r,m) of the present invention splits up a multicast network request to a replication request and a point-to-point switching request, the routings of both can be manipulated in parallel, while the routing algorithm complexity of the copy network is $\mathcal{C}_C(r,m)$ is just O(1), resulting in a routing algorithm complexity of the whole multicast network being determined solely by the routing algorithm complexity of the point-to-point unicast network. Therefore, the routing algorithm complexity of the AWG based multicast network $\mathcal{C}$ (r,m) of the present invention is equivalent to that of a unicast network.

DETAILED DESCRIPTION OF THE INVENTION AND EMBODIMENTS

In combination with drawings and embodiments hereunder provided, the present invention is further enunciated. The embodiments are meant to illustrate rather than limit the scope of the present invention, and all modifications by a person of the art, after reading of the present invention, shall fall within the scope of the appended claims.

An AWG based non-blocking optical multicast switching network for realizing non-blocking multicast switching by cascading two AWG based copy networks, comprising (1) An N×N network: a network with N input channels and N output channels.

(2) An m×m AWG: an AWG having m input ports and m output ports, with each input/output port carrying m input wavelength channels.

Figure 1:
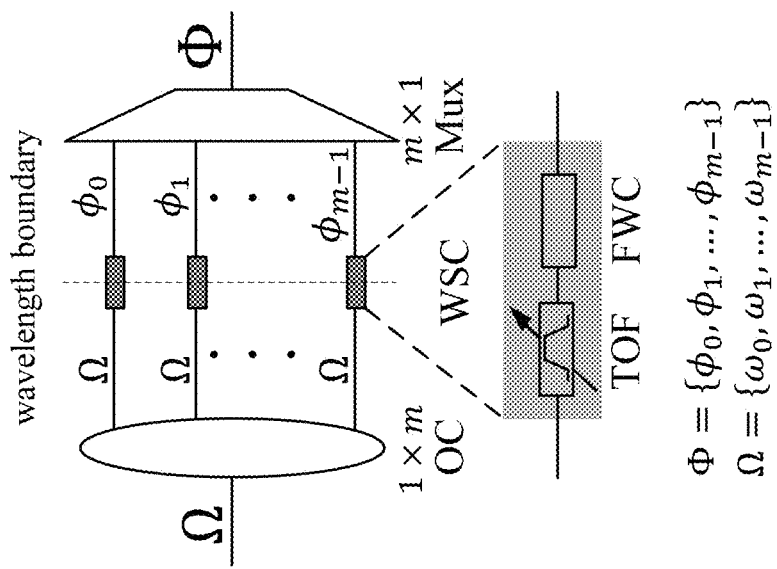
FIG. 1 is a schematic diagram of an m×m WR-module.

(3) An m×m WR-module: a wavelength replication module capable of copy a signal from any one or multiple channels of the m input wavelength channels to any one or multiple channels of the m output wavelength channels as shown in FIG. 1, and is constructed from a 1×m optical coupler (OC) connected to an m×1 multiplexer (Mux) via m wavelength selective converters (WSC), with each wavelength selective converter being comprised of a tunable optical filter (TOF) and a fixed length converter (FWC), Ω and Φ being respectively a set of input wavelengths and a set of output wavelengths, the input signal being broadcasted from the 1×m OC to the m WSCs, a wavelength signal to be copied or converted for each WSC being selected by the TOF and converted by the FWC, and a converted signal being multiplexed and outputted via the m×1 Mux.

(4) A wavelength boundary: a fictitious boundary on the middle of each WR-module dividing the WR-module into two parts, for logically indicating a boundary wherein an input wavelength is converted to an output wavelength. Wavelength conversion endows the WR-module with a wavelength separability, that is, an input wavelength on the left of the wavelength boundary is unrelated to an output wavelength on the right thereof as shown in FIG. 1.

(5) N×N AWG based copy network $\mathcal{C}_A(r,m)$ in three stages: constructed from m×m WR-modules and m×m AWGs. The copy network in three stages has r input ports and r output ports, with each port being arranged with an m×m WR-module, totaling respectively r m×m WR-modules on both the input stage and the output stage; each m successive m×m WR-modules in a same stage are connected to an m×m AWG, totaling respectively r' m×m AWGs on both the input side and the output side, wherein r=r'm; in the middle stage in-between the r' m×m AWGs on the input side and the r' m×m AWGs on the output side there are m copy networks $\mathcal{C}_A(\mathrm{r'},\mathrm{m})$, each output port of each AWG on the input side being connected with an input port of one of the middle stage copy networks $\mathcal{C}_A(\mathrm{r'},\mathrm{m})$, each input port of each AWG on the output side being connected with an output port of one of the middle stage copy networks $\mathcal{C}_A(\mathrm{r'},\mathrm{m})$, In the $\mathcal{C}_A(\mathrm{r},\mathrm{m})$ as shown in FIG. 2, subsequent to successive top down labeling of the WR-modules on the input stage, the AWGs on the input side, the central subnetworks, the AWGs on the output side, and the WR-modules on the output stage, the WR-module on the input stage with a label $\alpha$ is connected with the central subnetworks $\mathcal{C}_A(\mathrm{r'},\mathrm{m})$ with the label $\gamma$ via a wavelength $\lambda_x$, and the WR-module on the output stage with the label $\beta$ is connected with the central subnetworks $\mathcal{C}_A(\mathrm{r'},\mathrm{m})$ with the label $\gamma$ via the wavelength $\lambda_y$, wherein $k=[[\alpha]_m+\gamma]_m$, and $l=[[\beta]_m+\gamma]_m$.

(6) the middle stage subnetworks $\mathcal{C}_A(\mathrm{r'},\mathrm{m})$ of the N×N copy network $\mathcal{C}_A(\mathrm{r},\mathrm{m})$: smaller scale copy networks comprised of m×m WR-modules and m×m AWGs constructed recursively via the same method as that for constructing the $\mathcal{C}_A(\mathrm{r},\mathrm{m})$, having r' input ports and r' output ports, with each port being arranged with an ×m WR-module, each m successive m×m WR-modules being connected to an m×m AWG, totaling respectively r' m×m AWGs on both the input side and the output side, in the middle stage in-between the r' m×m AWGs on the input side and the r' m×m AWGs on the output side there being m middle stage subnetworks, each output port of each AWG on the input side being connected with an input port of one of the middle stage subnetworks, each input port of each AWG on the output side being connected with an output port of one of the middle stage subnetworks.

Figure 2:
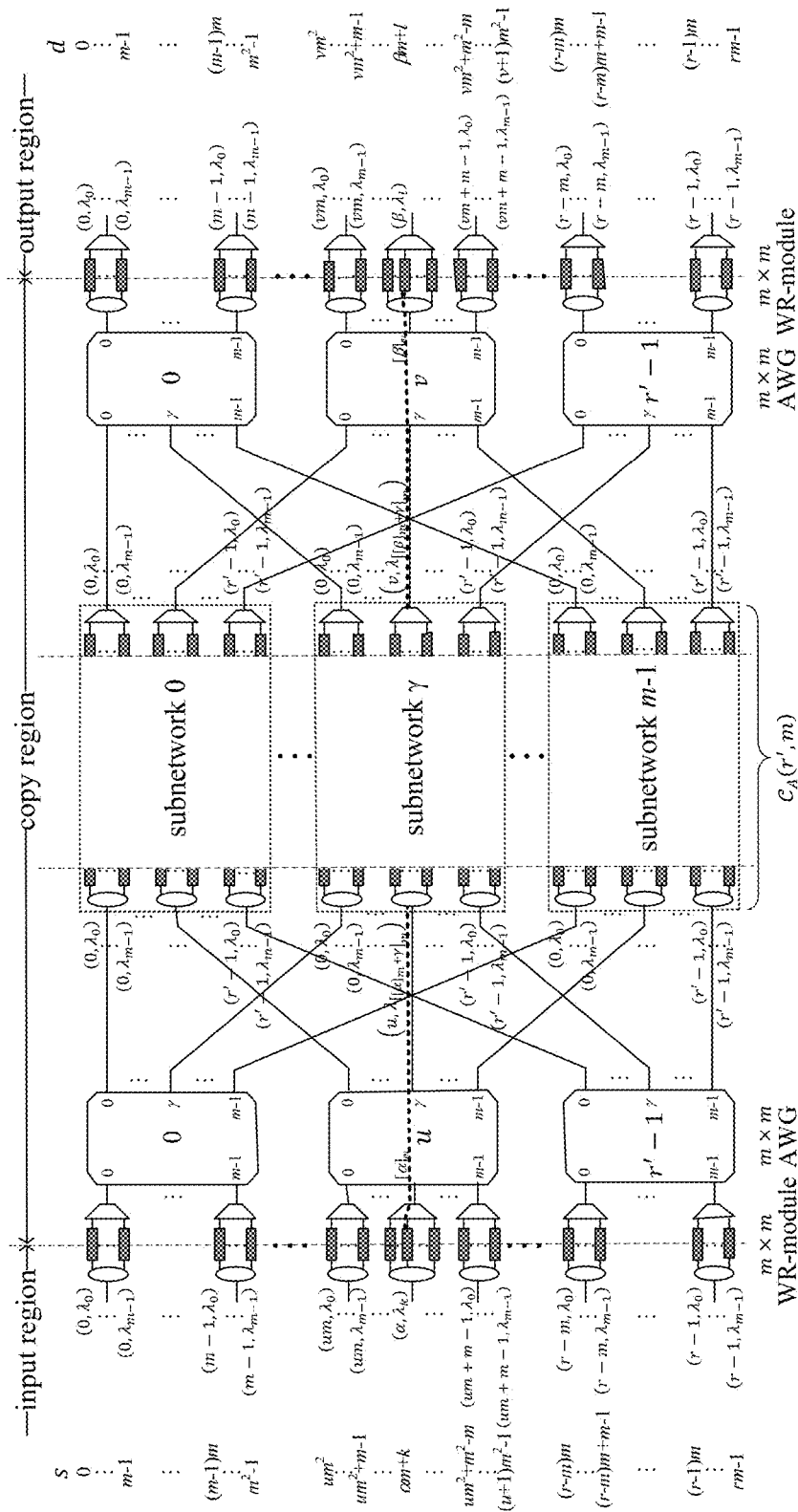
FIG. 2 is a schematic diagram of the AWG based N×N copy network $\mathcal{C}_A(r,m)$ in three stages.

(7) input region: a region in $\mathcal{C}_A(\mathrm{r},\mathrm{m})$ on the input side separated out of the wavelength boundaries of all the WR-modules on the input stage as shown in FIG. 2.

(8) output region: a region in $\mathcal{C}_A(\mathrm{r},\mathrm{m})$ on the output side separated out of the wavelength boundaries of all the WR-modules on the output stage as shown in FIG. 2.

(9) copy region: a region in $\mathcal{C}_A(\mathrm{r},\mathrm{m})$ in-between the wavelength boundaries of all the WR-modules on the input stage and the wavelength boundaries of all the WR-modules on the output stage as shown in FIG. 2.

(10) wavelength set of the input region of the copy network: a wavelength set for carrying input channels in each input port in $\mathcal{C}_A(\mathrm{r},\mathrm{m})$, representable via $\Lambda=\{\lambda_0, \lambda_1, \ldots, \lambda_{m-1}\}$, due to the wavelength separability of the WR-module.

(11) wavelength set of the output region of the copy network: a wavelength set for carrying input channels in each output port in $\mathcal{C}_A(\mathrm{r},\mathrm{m})$, representable via $\Lambda=\{\lambda_0, \lambda_1, \ldots, \lambda_{m-1}\}$, due to the wavelength separability of the WR-module.

(12) wavelength set of the copy region of the copy network: a wavelength set for carrying channels in the copy region, representable via $\Lambda=\{\lambda_0, \lambda_1, \ldots, \lambda_{m-1}\}$, due to the wavelength separability of the WR-module and in consideration of the recursive construction of the network.

(13) input wavelength channel: situated on the WR-module with the label $\alpha$ on the input stage and carried by the wavelength $\lambda_k$, and is denoted by $(\alpha, \lambda_k)$, wherein $\alpha=0, 1, \ldots, \mathrm{r}-1, k=0, 1, \ldots, \mathrm{m}-1$ as shown in FIG. 2.

(14) output wavelength channel: situated on the WR-module with the label $\beta$ on the output stage and carried by the wavelength $\lambda_l$, and is denoted by $(\beta, \lambda_l)$, wherein $\beta=0, 1, \ldots, \mathrm{r}-1, l=0, 1, \ldots, \mathrm{m}-1$ as shown in FIG. 2.

(15) one-dimensional labels for the input channels: one-dimensional labels for the input wavelength channels $(\alpha, \lambda_k)$ are $s=m\alpha+k$, $s=0, 1, \ldots, \mathrm{rm}-1$ as shown in FIG. 2.

(16) one-dimensional labels for the output channels: one-dimensional labels for the output wavelength channels $(\beta, \lambda_l)$ are $d=r\beta+l$, $d=0, 1, \ldots, \mathrm{rm}-1$ as shown in FIG. 2.

(17) number of times i of recursive decomposition: the number of times for decomposing the subnets of the copy network into smaller ones comprised of WR-modules, AWGs, and smaller subnets in the same manner for constructing the copy network, $i=1, \ldots, \log_m \mathrm{r}-1$.

Figure 3:
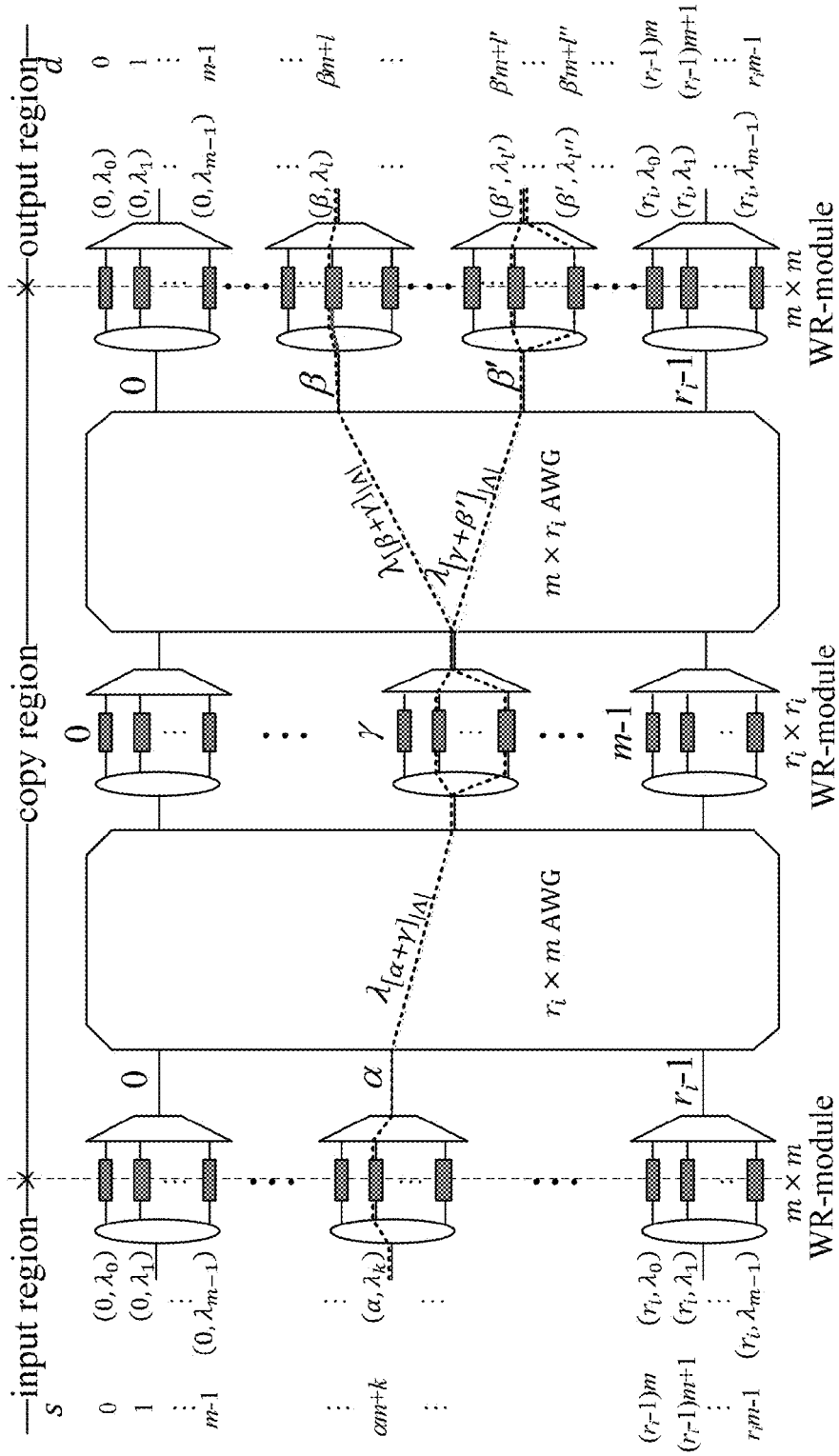
FIG. 3 is a schematic diagram of an AWG based copy network $\mathcal{C}_B(r_i,m)$ in three stages.

(18) AWG based copy network $\mathcal{C}_E(\mathrm{r}_i, \mathrm{m})$ in three stages: comprised of three stages of WR-modules and two AWGs by means of decomposition of subnetworks of the copy network $\mathcal{C}_A(\mathrm{r},\mathrm{m})$, having $\mathrm{r}_i$ m×m WR-modules on the input stage, m $\mathrm{r}_i \times \mathrm{r}_i$ WR-modules on the middle stage, and $\mathrm{r}_i$ m×m WR-modules on the output stage, the input stage and the middle stage being connected with an $\mathrm{r}_i \times \mathrm{m}$ AWG, the middle stage and the output stage being connected with an m×$\mathrm{r}_i$ AWG, there being $\mathrm{mr}_i$ input channels on the input side, there being $\mathrm{mr}_i$ output channels on the output side, subsequent to successive top down labeling of the WR-modules on the input stage, the AWGs on the input side, the middle stage WR-modules, the AWGs on the output side, and the WR-modules on the output stage, the WR-module on the input stage with the label $\alpha$ is connected with the middle stage WR-module with the label $\gamma$ via the wavelength $\lambda_x$, and the WR-module on the output stage with the label $\beta$ is connected with the middle stage WR-module with the label $\gamma$ via the wavelength $\lambda_y$, wherein $x'=[\alpha+\gamma]_{|\Lambda|}$, $y'=[\beta+\gamma]_{|\Lambda|}$, and $|\Lambda|=\max\{\mathrm{r}_i,\mathrm{m}\}$ as shown in FIG. 3.

(19) AWG based N×N copy network $\mathcal{C}_C(\mathrm{r},\mathrm{m})$: a multi-stage copy network comprised of m×m WR-modules and m×m AWGs by means of $i=\log_m \mathrm{r}-1$ times of recursive decomposition of subnets of $\mathcal{C}_A(\mathrm{r},\mathrm{m})$, having the middle network cell $\mathcal{C}_B(\mathrm{m},\mathrm{m})$.

(20) AWG based N×N multicast network $\mathcal{C}(\mathrm{r},\mathrm{m})$: comprising two $\mathcal{C}_C(\mathrm{r},\mathrm{m})$ networks, by means of combining the output stage $\mathcal{C}_C(\mathrm{r},\mathrm{m})$ for replication on the input side with the input stage $\mathcal{C}_C(\mathrm{r},\mathrm{m})$ for point-to-point switching on the output side.

(21) wavelength granularity: the number of various wavelengths employed in the optical multicast network, the wavelength granularity for $\mathcal{C}(\mathrm{r},\mathrm{m})$ is m.

Figure 4:
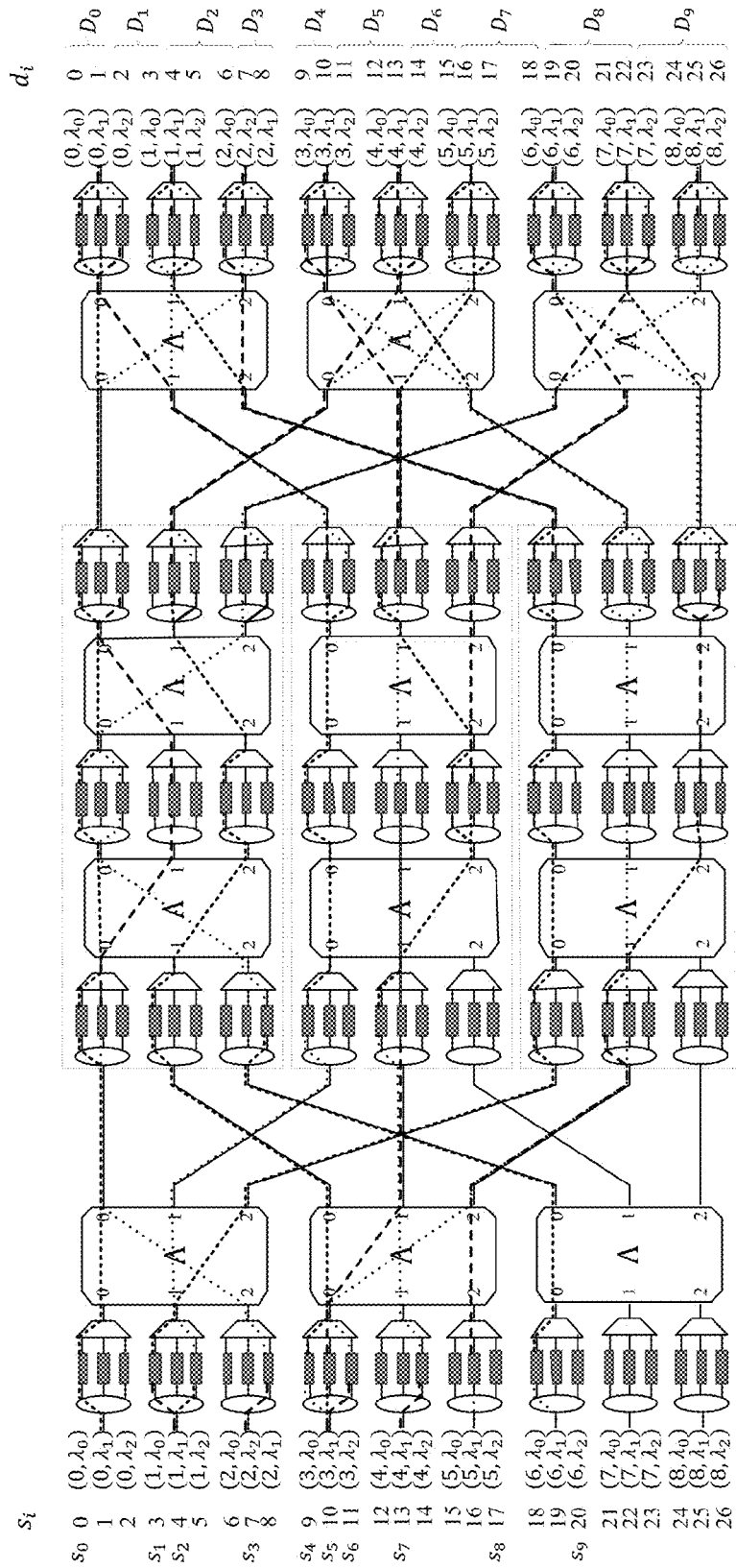
FIG. 4 is a schematic diagram of a structure and routing path of an AWG based 27×27 copy network $\mathcal{C}_C(9,3)$ in three stages.
Figure 5:
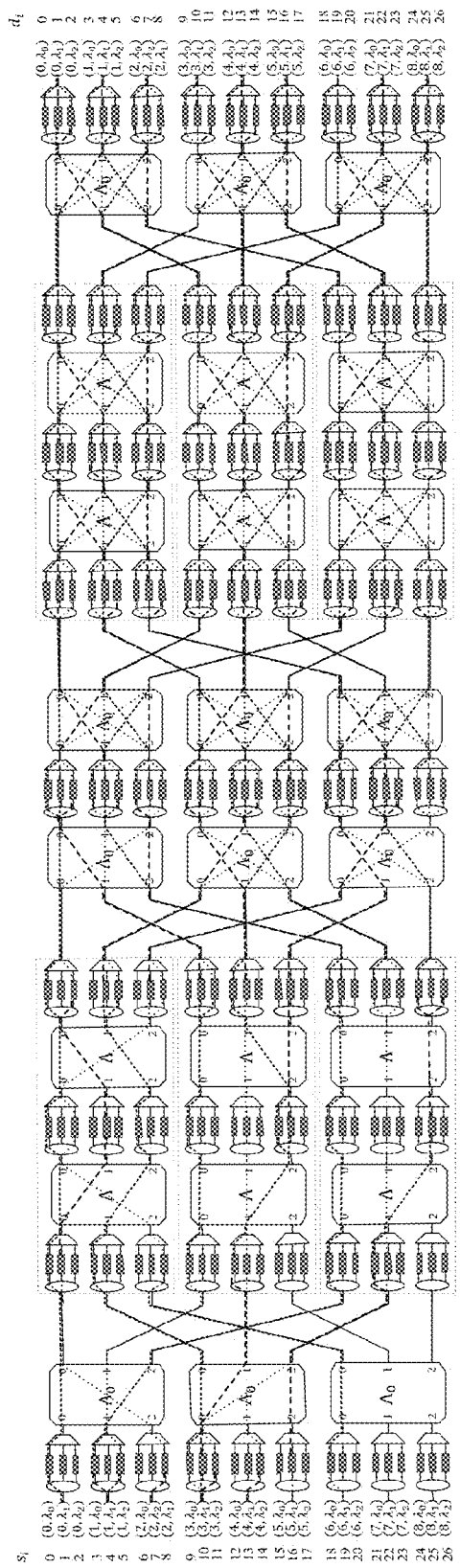
FIG. 5 is a schematic diagram of construction of an AWG based 27×27 multicast network $\mathcal{C}$ (9,3).

The method for constructing the AWG based N×N non-blocking optical multicast switching network is employed in a specific embodiment for constructing an AWG based 27×27 multicast network $\mathcal{C}(9,3)$, and comprises the following constructing steps:

(1) constructing an AWG based 27×27 multi-stage copy network $\mathcal{C}_C(9,3)$: first constructing a three-stage copy network $\mathcal{C}_A(9,3)$, having 3 input ports and 3 output ports, with each port carrying 3 wavelength channels: arranging an 3×3 WR-module on each input/output port on the input stage of the network, with each 3 consecutive 3×3 WR-modules being connected with a 3×3 AWG, arranging 3 middle stage copy networks $\mathcal{C}_A(3,3)$ to be in-between the 3 3×3 AWGs on the input side and the 3 3×3 AWGs on the output side, each output port of each AWG on the input side being connected with an input port of one of the middle stage copy networks $\mathcal{C}_A(3,3)$, each input port of each AWG on the output side being connected with an output port of one of the middle stage copy networks $\mathcal{C}_A(3,3)$; constructing subnets of the $\mathcal{C}_A(3,3)$ recursively for i=log$_3$ 9−1=1 times in a same manner until the middle stage network cell being $\mathcal{C}_B(3,3)$, and thus the multi-stage copy network $\mathcal{C}_C(9,3)$ is constructed as shown in FIG. 4;

(2) constructing an AWG based 27×27 multicast network $\mathcal{C}(9,3)$: cascading the two copy networks $\mathcal{C}_C(9,3)$ by means of combining an output stage WR-module of the $\mathcal{C}_C(9,3)$ for performing replication on the input side with an input stage WR-module of the $\mathcal{C}_C(4,2)$ for performing point-to-point switching on the output side to construct the $\mathcal{C}(9,3)$;

and comprises the following routing steps:

(1) labeling the channels for the copy network $\mathcal{C}_C(9,3)$: labeling the input/output channels in a top down manner, as is shown on FIG. 4;

(2) splitting up of a multicast request: splitting up a multicast request from the $\mathcal{C}(9,3)$:

$$\begin{pmatrix} \text{addresses of input channels} \\ \text{set of addresses of output channels} \end{pmatrix} =$$

$$\begin{pmatrix} 0 & 3 & 4 & 7 & 9 & 10 & 11 & 13 & 17 & 20 \\ \{1,3\} & \{6,19\} & \{11,0,25\} & \{18,21\} & \{7,15\} & \{16,10,2\} & \{9,22\} & \{26,24,4\} & \{23,5,17,8\} & \{13,14,12,20\} \end{pmatrix}$$

to be a replication sub-request in the copy network $\mathcal{C}_C(r,m)$:

$$\begin{pmatrix} \text{addresses of input channels} \\ \text{set of addresses of output channels} \end{pmatrix} =$$

$$\begin{pmatrix} 0 & 3 & 4 & 7 & 9 & 10 & 11 & 13 & 17 & 20 \\ \{0,1\} & \{2,3\} & \{4,5,6\} & \{7,8\} & \{9,10\} & \{11,12,13\} & \{14,15\} & \{16,17,18\} & \{19,20,21,22\} & \{23,24,25,26\} \end{pmatrix}$$

and a point-to-point switching sub-request:

$$\begin{pmatrix} \text{addresses of input channels} \\ \text{set of addresses of output channels} \end{pmatrix} =$$

$$\begin{pmatrix} 0 & 1 & 2 & 3 & 4 & 5 & 6 & 7 & 8 & 9 & 10 & 11 & 12 & 13 & 14 & 15 & 16 & 17 & 18 & 19 & 20 & 21 & 22 & 23 & 24 & 25 & 26 \\ 1 & 3 & 6 & 19 & 11 & 0 & 25 & 18 & 21 & 7 & 15 & 16 & 10 & 2 & 9 & 22 & 26 & 24 & 4 & 23 & 5 & 17 & 8 & 13 & 14 & 12 & 20 \end{pmatrix}$$

(3) non-blocking routing and wavelength allocation of a monotone replication request from the copy network $\mathcal{C}_C(r,m)$:

(a) ordering the request: ordering the address of the input channel wherefrom comes the multicast request in a sequential manner, and labeling as $C_0=C(0,\{0,1\})$, $C_1=C(3,\{2,3\})$, . . . , $C_9=C(20, \{23,24,25,26\})$ (b) allocating routing paths: allocating the requests $C_0$, $C_1$, . . . , $C_9$ respectively to the middle stage WR-modules $[0]_3=0$, $[1]_3=1$, $[2]_3=2$, . . . , $[9]_3=0$;

(c) allocating wavelengths: with the request $C_1=C(3, \{2,3\})$ as an example, allocating the request to the middle stage subnetwork with the label γ=$[1]_3$=1 employing the wavelength $\lambda_2$ in-between the input stage WR-module with the label 1 and the middle stage subnetwork γ=1, employing the wavelength $\lambda_1$ in-between the input stage WR-module with the label 0 and the middle stage subnetwork γ=1 and allocating in a same manner recursively in each subnetwork: re-ordering the request from the subnetworks, labeling the request $C_1$ by a new label $C_{i'}$ in the subnetwork γ=1, wherein i'=⌊1/3⌋=0, allocating the routing paths and wavelengths in the subnetwork according to the new sequence number i'=0, that is, allocating the request to an middle stage WR-module in a subnetwork with the label γ=$[0]_3$=0, employing the wavelength $\lambda_0$ in-between the input stage WR-module and the middle stage with the label 0, employing the wavelength $\lambda_0$ in-between the output stage WR-module with the label 0 and the middle stage subnetwork γ=0, thus is the optical path traversed by the request $C_1$: inputted by the wavelength $\lambda_0$, converted $\lambda_0$ to via the input stage WR-module with the label 1, converted to $\lambda_0$ via the middle stage WR-module in the subnetworks with the label 0, replicated to $\lambda_1$ and $\lambda_2$ via the WR-module with the label 0 of a subnetwork on the output side, $\lambda_1$ is subsequently converted to $\lambda_2$ by the output stage WR-module with the label 0 and is outputted, and $\lambda_2$ is converted to $\lambda_0$ by the output stage WR-module with the label 1 and is outputted, and similarly the other requests are allocated routing paths and wavelengths;

(4) non-blocking routing of a point-to-point switching request of the copy network $\mathcal{C}_C(r,m)$ for point-to-point switching: routing by means of a prior art algorithm.

We claim:

1. A method for constructing an Arrayed Waveguide Grating (AWG) based N×N non-blocking optical multicast switching network, comprising
  (1) constructing an AWG based N×N copy network $\mathcal{C}_A(r, m)$ having r input ports and r output ports, each of the input ports and output ports carrying m wavelengths,
  arranging an m×m wavelength replication module (WR-module) on each port so as to have r m×m WR-modules on both an input stage and an output stage, with each consecutive m m×m WR-modules on either the input stage or the output stage being connected with an m×m AWG, resulting in r' m×m AWGs on both an input side and an output side, r=r'm,
  arranging m middle stage copy networks $\mathcal{C}_A(r',m)$ to be in-between the r' m×m AWGs on the input side and the r' m×m AWGs on the output side, each output port of each AWG on the input side being connected with an input port of one of the middle stage copy networks $\mathcal{C}_A(r',m)$, each input port of each AWG on the output side being connected with an output port of one of the middle stage copy networks $\mathcal{C}_A(r',m)$, constructing the middle stage copy network $\mathcal{C}_A(r',m)$ recursively in a same manner;

(2) constructing an middle stage network cell $\mathcal{C}_B(r_i,m)$ by i recursive construction of subnetworks of the copy network $\mathcal{C}_A(r,m)$, followed by constructing the middle stage network cell $\mathcal{C}_B(r_i,m)$ to an AWG based three-stage copy network comprising three stages of WR-modules and two AWGs, $r_i$ m×m WR-modules on an middle input stage, m $r_i$×$r_i$ WR-modules on an middle stage, and $r_i$ m×m WR-modules on an middle output stage, the middle input stage being connected with the middle stage via an $r_i$×m AWG, and the middle stage being connected with the middle output stage via an m×$r_i$ AWG;

(3) constructing AWG based N×N copy networks $\mathcal{C}_C(r, m)$ by i=$\log_m$ r−1 times of recursive decomposition of subnets of $\mathcal{C}_A(r,m)$, each subnet being comprised of an m×m WR-module and an m×m AWG and having an middle stage network $\mathcal{C}_B(m,m)$;

(4) constructing an AWG based N×N multicast network $\mathcal{C}(r,m)$ by cascading the two copy networks $\mathcal{C}_C(r,m)$ by combining an output stage WR-module of one $\mathcal{C}_C(r,m)$ for performing replication on the input side with an input stage WR-module of the other $\mathcal{C}_C(r,m)$ for performing point-to-point switching on the output side.

2. The method of claim 1, further comprising splitting up an optical multicast request into a copy request on the copy network on the input side and a point-to-point unicast switching request on the copy network on e output side, wherein the copy network on the input side replicates data according to a number of required data copies of the multicast request by allocating a set of consecutive output ports of the copy network on the input side for each multicast request according to a size of a label of an input channel thereof, a number of the ports of the copy network on the input side allocated for the multicast request is determined by the number of required data copies so as to constitute a copying request on the copy network of the input side; and the copy network on the output side conducts a point-to-point switching for the data copy by routing each data copy on the input port of the copy network on the output side according to an actual destination address thereof and a unicast routing algorithm so as to switch the data copy to a corresponding destination output channel.

3. The method of claim 1, wherein a non-blocking optical copy network comprises a WR-module and an AWG, one of the m×m WR-modules copies a signal on one or multiple channels of the m input wavelength channels onto the copy module on one or multiple channels of the m output wavelength channels, the copy module comprises a 1×m optical coupler connected with an m×1 multiplexer Mux via m wavelength selective converters WSCs, each WSC comprises a tunable optical filter TOF and a fixed wavelength converter FWC, the input signal is broadcasted from the 1×m optical coupler to the m WSCs, a wavelength signal to be copied or converted for each WSC is selected by the TOF and converted by the FWC, and a converted signal is multiplexed and outputted via the m×1 Mux.

4. The method of claim 1, further comprising successively labeling in the $\mathcal{C}_A(r,m)$, from top down, the WR-modules on the input stage, the AWGs on the input side, the middle subnets, the AWGs on the output side, and the WR-modules on the output stage, connecting the WR-module on the input stage with a label α with the middle subnet with the label γ via a wavelength $\lambda_x$, and connecting the WR-module on the output stage with the label β with the middle subnet with the label γ via the wavelength $\lambda_y$, wherein x=$[[\alpha]_m+\gamma]_m$ and y=$[[\beta]_m+\gamma]_m$.

5. The method of claim 1, further comprising successively labeling in the $\mathcal{C}_E(r_i,m)$ from top down the WR-modules on the input stage, the AWGs on the input side, the middle WR-modules, the AWGs on the output side, and the WR-modules on the output stage, connecting the WR-module on the input stage with the label α with the middle WR-module with the label γ via the wavelength $\lambda_{x'}$, and connecting the WR-module on the output stage with the label β with the middle WR-module with the label γ via the wavelength $\lambda_{y'}$, wherein x'=$[\alpha+\gamma]_{|\Lambda|}$, y'=$[\beta+\gamma]_{|\Lambda|}$, and $|\Lambda|$=max$\{r_i,m\}$.

6. The method of claim 1, wherein the two AWG based copy networks are successively cascaded, the output stage WR-module of the first copy network is combined with the input stage WR-module of the second copy network to be a WR-module in one column, the first copy network generating a required data copy and the second copy network switching the data copy to a final destination output channel.

7. The method of claim 1, wherein a non-blocking optical copy network is constructed by an m×m WR-module and an m×m AWG, and the numbers of the WR-modules and the AWGs remain unchanged irrespective of a scale of the optical multicast switching network.

8. The method of claim 1, wherein the AWG based copy network on the input side is routed by successively labeling all the input channels and the output channels respectively as 0, 1, . . . , N−1;

ordering all the requests according to the labels of the input channels thereof as 0, 1, 2, . . . ;

labeling the middle stage subnetworks from 0 to m−1 successively; and allocating the middle stage subnetwork with the label $[i]_m$ to the request i.

* * * * *